July 10, 1962

W. E. TWAMLEY ETAL 3,043,173

CUTTING-OFF TOOL POST

Filed Feb. 5, 1959

INVENTORS
WILLIAM E. TWAMLEY
JAMES W. CARROLL
BY

*Barlow & Barlow*

ATTORNEYS

United States Patent Office 3,043,173
Patented July 10, 1962

3,043,173
CUTTING-OFF TOOL POST
William E. Twamley, Providence, R.I., and James W. Carroll, Somerset, Mass., assignors to Brown & Sharpe Manufacturing Company, a corporation of Rhode Island
Filed Feb. 5, 1959, Ser. No. 791,361
4 Claims. (Cl. 82—37)

This invention relates to a tool post more particularly to a cutting-off tool post for use on a lathe or some other machine tool.

In the use of a cutting-off tool post many adjustments are necessary in order that the tool may be located in the proper relation to the work. Such adjustments were heretofore made largely by varying the position of the entire unit which held the tool with relation to the bed of the machine on which it is mounted or by adjusting the tool in the unit both of which were frequently awkward.

One of the objects of this invention is to provide a tool post which will be more readily adjustable so that the tool may be positioned with accuracy and with a minimum amount of time in the position which it is desired the tool should be located.

Another object of this invention is to provide a means of adjustment which will not injure or abrade the surface of the machine upon which the entire unit is mounted.

A more specific object of this invention is to provide a locating plate to engage the bed or slide of the machine on which this tool is mounted and pivoted the same and to then mount and adjust the body of the tool holder on this plate so that it may have an adjustment in different directions or planes for the accomplishment of the desired result.

Another object of the invention is to provide a single tightening means which will secure the tool post to the machine and also all of its parts in adjustment.

Another object of the invention is to utilize this securing means for holding all the parts assembled so that if the unit is removed from the machine, the parts will all be together as a single unit.

Another object of the invention is to space the adjustable parts when not bound together so that they may be more easily adjusted without cramping or binding of the parts.

With these and other objects in view, the invention consists of certain novel features of construction as will be more fully described and particularly pointed out in the appended claims.

In proceeding with this invention, I have provided a plate which has a tongue on its lower surface to fit into the T-shaped groove in the bed of the machine on which the tool will be located. While on the upper surfaces of this plate, there is a key which is rounded in cross-section and which receives an inverted channel member so that the key fits into the channel of this member. Some sort of spring means tend to separate the channel member from the key and plate. Upon this channel member there is swivelly mounted the body of the tool post which has some means for clamping the tool. This body may be swivelled horizontally with relation to the channel member by screws threaded in the body and engaging the channel member. The body has a leg which will engage the bed of the machine between the cutting end of the tool and the key while there will be provided on the other side of the key a screw threaded in the body engaging the bearing plate to rock the tool about this leg for varying the height of the cutting edge of the tool, the rounded section of the key serving to permit this rocking movement. A bolt having a head to engage the overhanging edges of the groove extends through all of these parts so as to bind all of the parts together when adjustment has been made and also to bind the tool posts on the machine. Thus this single binding screw serves all binding purposes, and it also serves to maintain all of the parts together as a unit when the post is removed from the machine.

Figure 4:
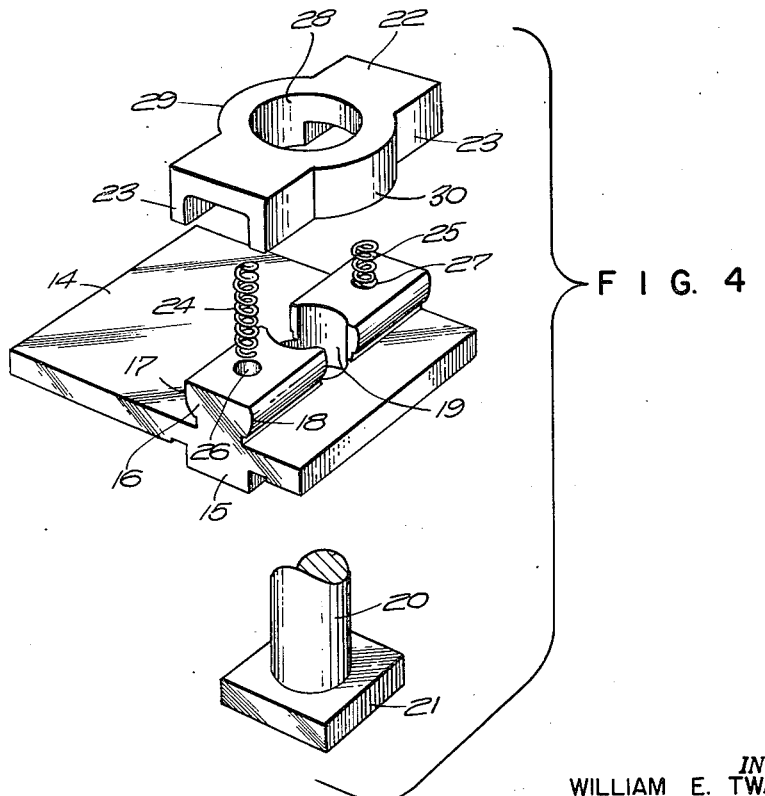
FIGURE 4 is an exploded view of the various parts in the lower portion of the post.

With reference to the drawings, 10 designates the base or bed of a machine, such as a lathe, upon which the tool post will be mounted. This base has an inverted T-shaped groove 11 with overhanging portions 12 so as to permit adjustment of the tool perpendicular to the plane of the paper. A bearing plate 14 is provided with a tongue 15 of a size to enter the small portion of the groove and align the plate 14 therewith. This plate is of substantially the same thickness throughout its major portion and is of hardened steel or some material which will provide a good bearing surface. A key 16 is on the upper surface of the plate and may conveniently be located directly opposite the tongue 15. The key has its opposite sides 17 and 18 rounded as seen in FIGURE 4. A hole 19 extends through this plate at the location of the tongue and key for the reception of a bolt 20 having a head 21 which will extend beneath the overhanging portions 12 of the groove 11 in the bed or slide 10.

A saddle member 22 which is channel-shaped in cross section with the legs 23 of the channel extending downwardly and spaced apart sufficiently to receive the key 16. These legs straddle this key and the member is held in spaced relation or away from the key by means of a pair of springs 24 and 25 which are located in and guided by the walls of the openings 26 and 27. These springs engage the undersurface of the channel member 22 and lift it from the key. Thus, rocking movement of this channel member about the key about an axis parallel to the general extent of the key may readily be had. An opening 28, extending through this channel member, aligns with opening 19 and also receives the shank of the bolt 20. In the mid portion of this channel member 22 the sides bulge outwardly as at 29, 30 and form a portion of a cylinder for swivelly mounting the body 31 of the tool post.

Figure 1:
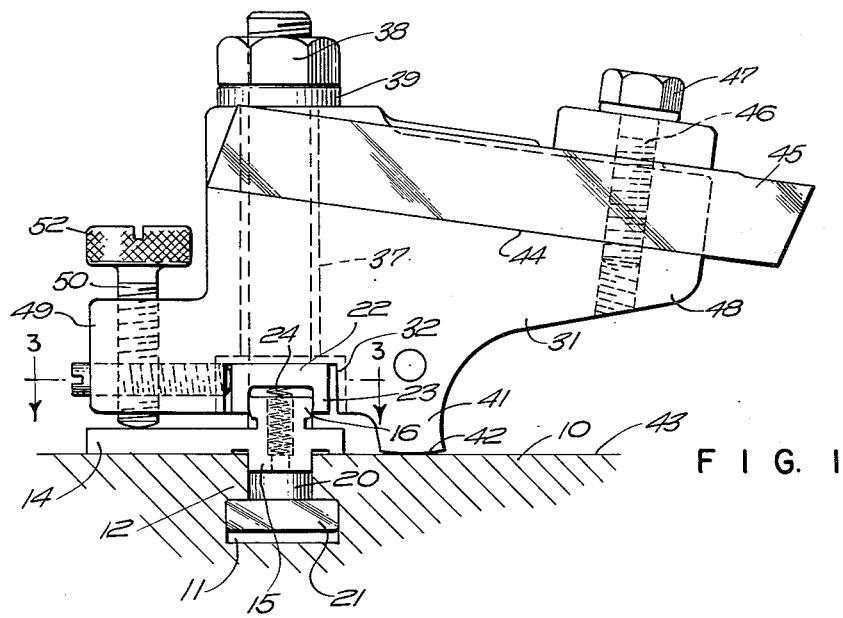
FIGURE 1 is an elevation showing the bed of the machine on which it is mounted in section.
Figure 2:
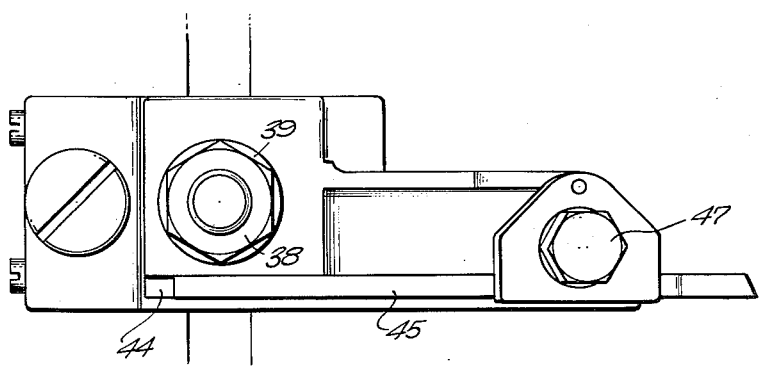
FIGURE 2 is a top plan view.
Figure 3:
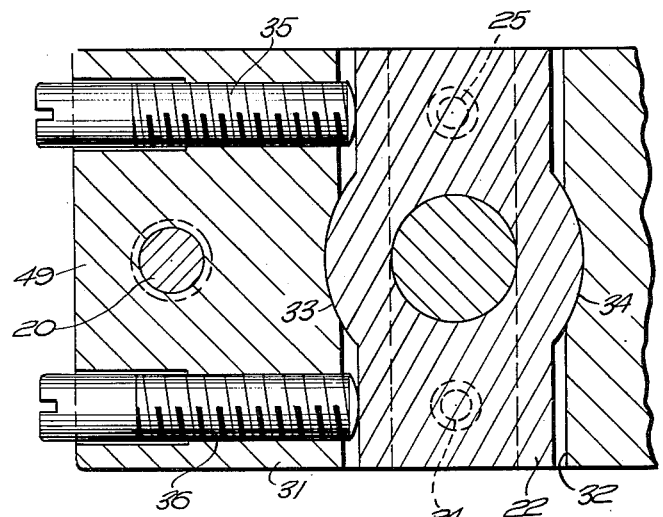
FIGURE 3 is a section on line 3—3 of FIGURE 1.

The body of the tool post has a recess 32 of a size substantially wider than the width of the channel member 22 as may be seen in FIGURE 3, and the walls of this recess are arched as at 33 and 34 to form portions of a surface of a cylinder of substantially the size of the bulging portions 29 and 30 so as to receive these bulging portions and swively mount the body 31 on this channel member as may be seen in FIGURE 3. Screws 35 and 36 having slots in their ends are threaded through the body 31 and engage the channel member 22 on either side of the axis of the swivel mounting so as to adjust this body member in a horizontal plane or about a vertical axis to square the same with the machine. This body member also has a bore 37 extending vertically through it so as to receive the bolt 20 which is threaded at its upper end for the reception of the nut 38 which through washer 39 engaging the upper edge of the body may be used for binding all of the parts in position and the unit to the machine.

A leg 41 projects downwardly from the body between the recess 32 and the work which is to be operated upon and has a rounded surface 42 for engagement with the upper surface 43 of the bed of the machine.

The tool post is recessed as at 44 so as to carry the tool 45 which may be secured in position by the screw 46 having head 47 with its forward end projecting beyond the overhanging portion 48 of the tool.

On the rearwardly extending portion 49 of the body which is that portion through which the adjusting screws 35 and 36 extend I have provided a screw 50 having a head 52 which is slotted and also knurled which will engage the hardened bearing plate 14 so as to rock the body of the tool about the leg 42 as a fulcrum to adjust the height of the tool 45 with reference to its work. This adjustment is readily permitted by the rounded sides 17 and 18 of the key 16.

In operation the tool will first be adjusted along the groove 11 to approximately the desired position with the bolt 20 in released position. The body will then be squared up as desired by use of the screws 35 and 36. The tool 45 will then be adjusted approximately to its position desired in recess 44 and clamped by screw 46 and finished by an adjustment of the screw 50 after which all of the parts are bound in position by tightening up nut 38.

If it is desired to remove the whole unit from the machine, the same may be readily done by sliding the unit out of the end of the T slot 11 and as it was unnecessary to remove the nut 38, the bolt 20 will still hold all of the parts against separation or becoming lost and thus all will remain entirely intact during storage.

We claim:

1. A tool post comprising a bearing plate having a tongue on its lower surface to enter a groove in a machine on which it may be mounted and a key which is rounded in cross-section on its upper surface, a channel member receiving said key and resilient means between said channel member and key urging the same apart, said channel member having bulging sides with surfaces on the arc of a cylinder, a tool holding body having a recess with portions of its side walls on substantially the same cylindrical arc rockably receiving said bulging sides, screws in said body to engage said channel member on either side of said budging sides to rockably adjust the same in a horizontal plane and a screw through the body perpendicular to said plate and engaging the same to rock said body about said rounded key to adjust the same in a vertical plane, and a single bolt having ah ead to engage an undercut of a machine groove and extending through said tongue, key, channel member and body with a nut on its upper end to clamp the parts in adjustment and the tool post to the machine.

2. A tool post comprising a bearing plate having to key which is rounded in cross section on its upper surface, a channel member receiving said key and held in alignment thereby, and resilient means between said channel member and key urging the same apart to facilitate its rocking motion thereabout, a tool holding body, means at either side of the channel member to support the body independent of the channel member, said body having a recess receiving said channel member and being held in alignment thereby, a screw through the body engaging said plate to rock the body and channel member about said rounded key to adjust the same in a vertical plane and means passing through said plate, channel member and body to hold the same assembled.

3. A tool post comprising a bearing plate having a key on its upper surface which is rounded in cross section, a channel member receiving said key and held in alignment with the key, a tool holding body, means at either side of the channel member to support the body independent of the channel member, said body having a recess receiving said channel member to be held in alignment with the channel member, one of said supports being a screw through the body engaging said plate to rock said body and channel member about said key to adjust the same in a vertical plane, and a single bolt having a head protruding below said bearing plate to engage an undercut of a machine groove and extending through said key, channel member and body with a nut on its upper end to clamp the parts in adjustment and the tool post to the machine.

4. A tool post comprising a bearing plate having a key on its upper surface which is rounded in cross section, a channel member rockably receiving said key and held in alignment thereby, said channel member having bulging sides with surfaces on the arc of a cylinder, a tool holding body having a recess with portions of its side walls on substantially the same cylindrical arc rockably receiving said bulging sides, screws in said body to engage the channel member on either side of said bulging sides to rockably adjust the same in a horizontal plane, a screw through the body engaging said plate to rock said body and channel member about said key to adjust the same in a vertical plane and means passing through said plate, channel member and body to hold the same assembled.

References Cited in the file of this patent
UNITED STATES PATENTS

| | | |
|---|---|---|
| 467,437 | Ronan | Jan. 19, 1892 |
| 470,010 | Rhodes | Mar. 1, 1892 |
| 495,576 | Barraclough et al. | Apr. 18, 1893 |
| 545,314 | Rothwell | Aug. 27, 1895 |
| 1,229,802 | Spade | June 12, 1917 |
| 1,332,731 | Kreiger | Mar. 2, 1920 |
| 2,807,297 | Lucas | Sept. 24, 1957 |